Figure 3:
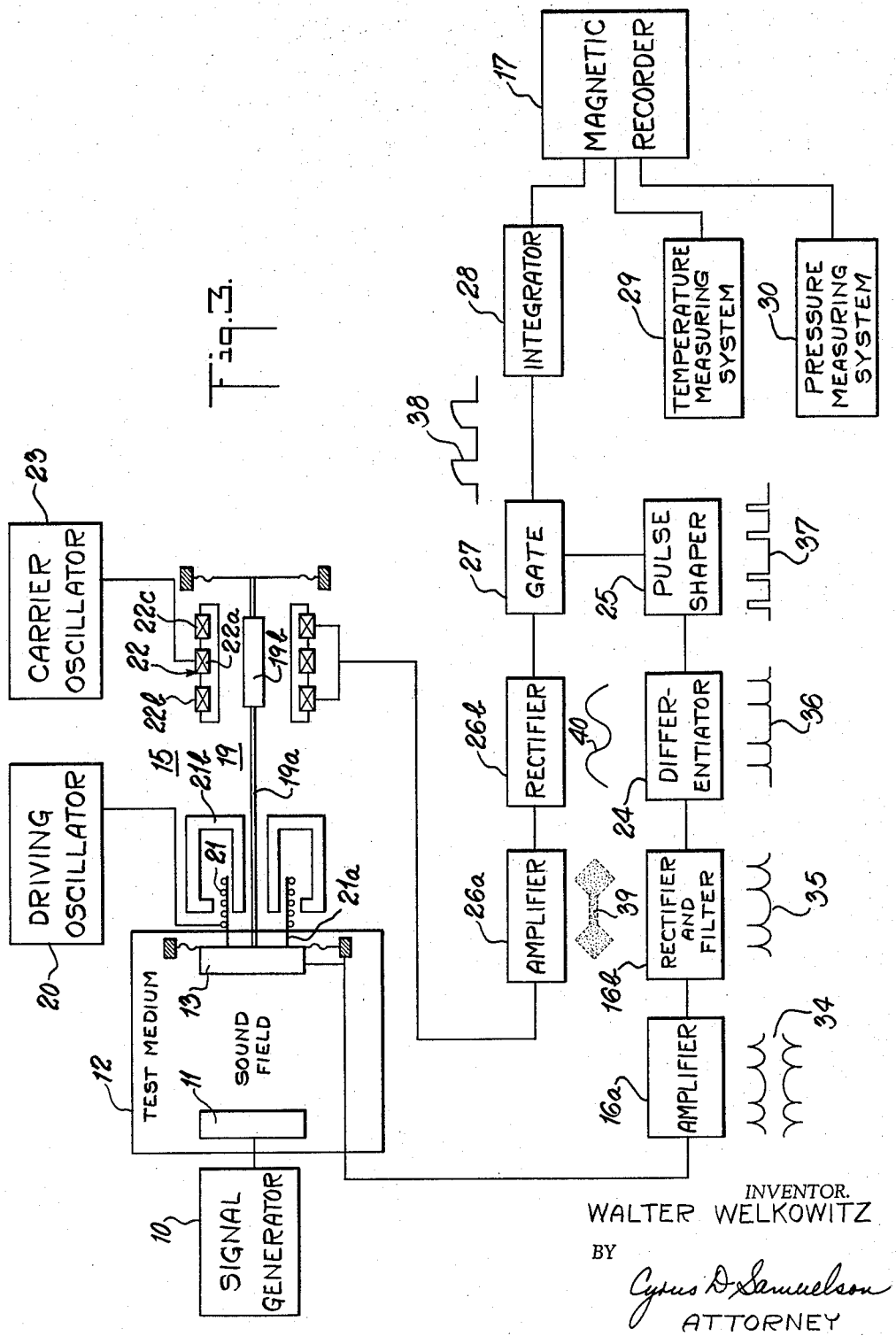

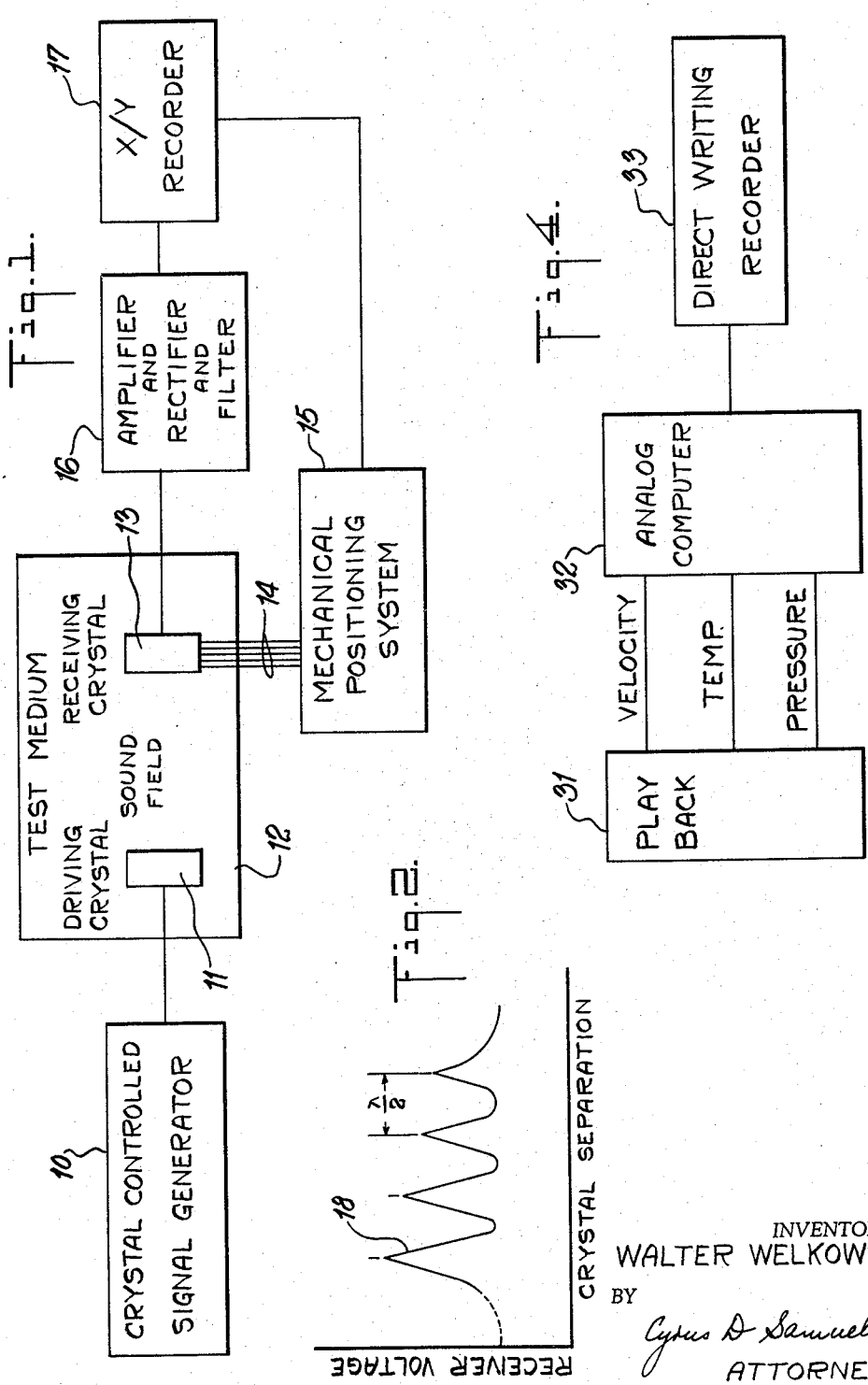

INVENTOR.
WALTER WELKOWITZ

United States Patent Office 2,959,959
Patented Nov. 15, 1960

2,959,959

HUMIDITY MEASURING SYSTEM

Walter Welkowitz, Nixon, N.J., assignor to Gulton Industries, Inc., Metuchen, N.J., a corporation of New Jersey Filed June 9, 1958, Ser. No. 740,677

8 Claims. (Cl. 73—336.5)

My invention relates to humidity measuring systems and in particular to those humidity measuring systems which employ a double-crystal ultrasonic interferometer to obtain an accurate determination of the sonic velocity in the test medium.

By means of my invention, it is possible to obtain a continuous indication of relative humidity. The system is automatically compensated for air temperature and pressure and has a time lag of no more than two or three seconds. The measurements are readily recorded in permanent form.

Broadly, my invention comprises a double-crystal ultrasonic interferometer by means of which I am able to obtain an accurate determination of the sonic velocity in the test medium. The transmitting or driving crystal sets up standing waves in the medium and the receiving crystal is moved continuously by an electromechanical vibrator in order to scan the region in which the standing-wave peaks occur. The output of a differential transformer, linear position transducer is used to define the instantaneous position of the receiving crystal accurately. Differentiation of the receiving crystal output yields a sharp pulse at the point correspondnig to the position of the pressure anti-node. This pulse is used to gate the differential transformer output, thereby producing a signal which is modulated in height and time by the velocity functions. This signal is integrated to give an output proportional to the velocity.

However, since the sonic velocity is a function of the temperature and pressure in addition to the humidity, supplementary systems such as, for example, a thermistor bridge and a differential transformer or strain gauge pressure gauge are provided to measure these functions. To obtain the relative humidity, the resulting data may be recorded and resolved manually by means of charts and nomographs or it may be fed directly to an analog computer and a direct-writing strip recorder.

It is an important object of my invention to provide a continuous, relative humidity indicating system.

It is a further object of my inventoin to provide a relative humidity indicating system which is automatically compensated for air temperature and pressure.

It is a still further object of my invention to provide a relative humidity indicating system which possesses a minimum amount of time lag.

Other objects and advantages of my invention will be apparent during the course of the following description when taken in conjunction with the accompanying drawings wherein:

Figure 1 is a simplified schematic block diagram of a preferred embodiment of a double-crystal ultrasonic interferometer of my invention utilized for sound velocity measurements, Figure 2 is an example of a plotting of the sound field produced by the driving crystal of Figure 1, Figure 3 is a detailed schematic block diagram of the embodiment of Figure 1, and Figure 4 is a simplified schematic block diagram of a preferred device utilized to retrieve the information recorded by the embodiment of Figures 1 and 3.

In the drawings, wherein, for the purpose of illustration, are shown preferred embodiments of my invention, the numeral 10 designates a crystal controlled, signal generator commonly used in the art and operating on a frequency in the range 800 kc. to 1200 kc. Generator 10 is used to excite transmitting or driving crystal 11 which is preferably piezoelectric being an X-cut quartz crystal of dimensions, for example, 0.1″ thick and ½″ in diameter for a frequency of 1 mc. However, any suitable ultrasonic electromechanical transducer may be used. Receiving crystal 13 is substantially identical to transmitting crystal 11; and both of them are placed in the test medium 12 whose humidity is being measured. The position of receiving crystal 13 with respect to transmitting crystal 11 is varied by an amount of the order of ¾λ in air or 0.3 mm. at 1 mc., as shown by lines 14 of Figure 1, by means of mechanical positioning system 15, which may be, for example, an electromechanical vibrator. The output of receiving crystal 13 is fed to amplifier 16a and thence to rectifier and filter 16b, which have been jointly designated in Figure 1 as 16. The output of amplifier and rectifier 16 is fed to X/Y recorder 17 where it is combined with the reference signal fed from mechanical positioning system 15. Curve 18 is a plot of receiver crystal voltage output against crystal separation. Amplifier 16a is preferably a broadband R-C amplifier with a gain of approximately 100 and rectifier and filter 16b is a standard rectifier of the diode type with a low-pass L-C filter.

Mechanical positioning system 15 comprises differential transformer 19, driving oscillator 20 and carrier oscillator 23. Driving oscillator 20 operates at a frequency of the order of 10 c.p.s. and is applied to coil 21 which is wound around damping cup 21a of differential transformer 19. The current in coil 21 cuts the magnetic field of magnet 21b and causes rod 19a to which 21a is affixed to move thereby causing receiving crystal 13 to move mechanically with respect to driving crystal 11. The movement of rod 19a causes core 19b which is affixed thereto to move with respect to differential transformer coil assembly 22, which action changes the ratio of coupling between primary 22a and secondaries 22b and 22c. Carrier oscillator 23 has an output frequency of the order of 400 to 1000 c.p.s. and a power of the order 0.1 to 1 watt which is applied to primary 22a. Secondaries 22b and 22c are connected in phase opposition and the initial balance is set so that the null position of the output is just beyond the maximum excursion of receiving crystal 13 so that no phase reversal is encountered.

The output of receiving crystal 13 is fed to amplifier 16a and thence to rectifier and filter 16b where the output signals are of the form illustrated by curves 34 and 35, respectively. From rectifier and filter 16b the signal is fed to differentiator and rectifier 24 whose output is of the form of curve 36. The output of differentiator and rectifier 24 is fed to pulse shaper 25 whose output is of the form of curve 37. The output of secondary coils 22b and 22c, which constitutes the reference frequency is fed to amplifier 26a whose output wave form is of the shape illustrated by curve 39 and thence to rectifier 26b whose output wave form is of the shape illustrated by curve 40. The signal from rectifier 26b is fed to gate 27 to a second input of which is fed the signal from pulse shaper 25 and whose output signal is fed to integrator 28. The output signal from integrator 28 is fed to magnetic recorder 17 which may utilize, for example, a Davies 1403B head manufactured by Minneapolis Honeywell Corporation where it is combined with similar signals from temperature measuring system 29 which is, for example, a thermistor bridge such as has been described in the Carboloy Thermistor Manual published by Carboloy Department of General Electric Company, dated March 22, 1954 and pressure measuring system 30 which is, for example, a strain gauge pressure gauge and bridge such as has been described in Bulletin No. 1.0 of Statham Laboratories, Inc. entitled "Statham Transducer Element," dated 12–56.

By way of illustration and not by way of limitation, following is a summary of examples of circuits and structure which I have used to fashion various elements of my invention:

Driving oscillator 20—low frequency signal generator with approximately 10 watts output;

Carrier oscillator 23—1 kc. oscillator, either crystal controlled or variably tuned, with a power output of approximately 0.1 watt;

Coil 21—vibrator coil, commonly used in the art;

Rod 19a—preferably formed of magnetic material;

Core 19b—differential transformer core preferably formed of magnetic material;

Coils 22a, 22b, 22c—differential transformer well-known in the art;

Differentiator 24—R-C type;

Amplifier 26a—any audio amplifier of type well-known in the art;

Rectifier 26b—diode rectifier and low-pass L-C filter;

Gate 27—preferably a pentode vacuum tube gate circuit;

Pulse shaper 25—multivibrator type;

Integrator 28—R-C type;

Playback 31—any standard type such as manufactured by Ampex Corporation of California;

Computer 32—any type which will solve equation $$V = K\sqrt{T}\left(1 + \frac{0.14h}{p}\right)$$

Recorder 33—any standard recorder such as manufactured by Sanborn Company of Waltham, Massachusetts.

The information which has been stored on the magnetic recording medium is played back on playback 31 whose output is fed to analog computer 32 and thence to direct writing recorder 33 which may be a strip recorder or similar device.

The velocity of sound in the medium is given by the equation:

$$V = K\sqrt{T}\left(1 + 0.14\frac{h}{p}\right)$$

where V is the sound velocity, K is a constant of proportionality, T is the temperature, $p$ is the pressure and $h$ is the humidity. Since the system measures V, T, and $p$, it is possible to calculate $h$ from the foregoing equation.

In operation, receiving crystal 13 is moved mechanically, as described heretofore, at a rate of the order of 10 c.p.s. The position of receiving crystal 13 is sensed by differential transformer 19, whose primary coil 22a is supplied with signal from carrier oscillator 23 of the order of 400 to 1000 c.p.s. The output voltage of receiving crystal 13 is of frequency of the order of 800 kc. to 1200 kc. as supplied from crystal controlled signal generator 10, and goes through one of the signal peaks illustrated in Figure 2. It goes through this peak, periodically, in accordance with the motion of rod 19a and displays two peak positions for each complete cycle of vibrated mechanical motion since the peak is scanned during both directions of crystal travel.

The output of receiving crystal 13 is amplified, rectified and differentiated so as to produce a sharp pulse as the signal goes through a maximum, curve 36. Pulse shaper 25 converts this signal to rectangular pulse signal 37 whose position carries the information representing the velocity of sound in the medium. Pulses 37 are used to gate the rectified output 40 of differential transformer 19 which defines the position of receiving crystal 13. The resulting gated output pulses 38 will vary in amplitude depending on their position on the output curve of differential transformer 19. The output of gate 27 is integrated in integrator 28 and results in a voltage which is directly proportional to the position of the maximum output peaks of system 11–12–13 and hence to the wavelength of the sonic signal.

Supplementary systems such as a thermistor bridge to measure temperature and a strain gauge to measure pressure must be used in conjunction with the humidity recording system of my invention. The humidity data may be extracted from the three records by several methods. The simplest technique is to record each function separately and to compute the relative humidity from curves or nomographs which can be made up from the equation for velocity. A more exact technique utilizes storing the information on magnetic tape and then employing the circuitry which has been illustrated in Figure 4 wherein analog computer 32 is used to resolve the three functions electrically and display the result on recorder 33.

I have found that there is a velocity change of about 1.1 meters per second when there is a shift of 100 percent relative humidity at a pressure of 760 mm. of mercury and a temperature of 370° K. This represents approximately a 0.3% change in sound velocity.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. A humidity measuring system for measuring humidity in a test medium comprising transmitting means for setting up sonic standing waves in the test medium, receiving means for detecting said sonic standing waves, means for continuously moving said receiving means back and forth along the axis of said sonic standing waves with respect to said transmitting means within a limit of approximately ¾ of a wavelength of said sonic standing waves, means for detecting the position of said receiving means, means responsive to said sonic standing wave detecting receiving means and to said means for detecting the position of said receiving means for measuring the velocity of sound in the test medium, means for measuring the pressure and temperature of the test medium and means responsive to said sound velocity, pressure and temperature measurements for solving the equation $$V = K\sqrt{T}\left(1 + 0.14\frac{h}{p}\right)$$

wherein V is the sound velocity, K is a constant of proportionality, T is the temperature, $p$ is the pressure and $h$ is the humidity.

2. A humidity measuring system as described in claim 1 wherein said transmitting means and said receiving means are substantially identical piezoelectric crystals.

3. A humidity measuring system as described in claim 1 wherein said means for moving said receiving means in an electromechanical vibrator.

4. A humidity measuring system as described in claim 1 wherein said means for detecting the position of said receiving means comprises a differential transformer, linear position transducer.

5. A humidity measuring system as described in claim 1 wherein said means for measuring the velocity of sound in the test medium comprises means for differentiating the output of said receiving means to produce a pulse, said pulse gating the output of said position detecting means to produce a signal modulated in height and time by sound velocity functions, and means for integrating said modulated signal to produce an output proportional to velocity.

6. A humidity measuring system for measuring humidity in a test medium comprising a piezoelectric transmitting crystal, a piezoelectric receiving crystal substantially identical with said piezoelectric transmitting crystal, an electromechanical vibrator connected to said receiving crystal to continuously move said receiving crystal back and forth along the axis of the sonic standing waves set up by said transmitting crystal with respect to said transmitting crystal within a limit of approximately ¾ of a wavelength of the sonic standing waves set up by said transmitting crystal, a differential transformer, linear position transducer mechanically coupled to said receiving crystal, the output of said differential transformer being responsive to the position of said receiving crystal, differentiating means for producing a pulse by differentiating the output of said receiving crystal, said pulse gating the output of said differential transformer to produce a signal modulated in height and time by sound velocity functions, integrating means integrating said modulated signal to produce an output proportional to velocity, means for measuring the pressure and temperature of the test medium and means responsive to the sound velocity, pressure and temperature measurements for solving the equation $$V = K\sqrt{T}\left(1 + 0.14\frac{h}{p}\right)$$

wherein $V$ is the sound velocity, $K$ is a constant of proportionality, $T$ is the temperature, $p$ is the pressure and $h$ is the humidity.

7. A humidity measuring system as described in claim 6 wherein the frequency of said sonic waves is of the order of 800 kc. to 1200 kc.

8. A humidity measuring system as described in claim 6 wherein the frequency of said electromechanical vibrator is of the order of 10 c.p.s.

References Cited in the file of this patent

UNITED STATES PATENTS

| 1,789,369 | Meissner | Jan. 20, 1931 |
| 2,758,663 | Snavely | Aug. 14, 1956 |

FOREIGN PATENTS

| 906,023 | Germany | Apr. 5, 1954 |